(12) United States Patent
Yasuda

(10) Patent No.: US 11,883,898 B2
(45) Date of Patent: Jan. 30, 2024

(54) METHOD OF RESISTANCE SPOT WELDING AND RESISTANCE SPOT WELDING APPARATUS

(71) Applicant: FUTABA INDUSTRIAL CO., LTD., Okazaki (JP)

(72) Inventor: Keigo Yasuda, Okazaki (JP)

(73) Assignee: FUTABA INDUSTRIAL CO., LTD., Okazaki (JP)

(*) Notice: Subject to any disclaimer, the term of this patent is extended or adjusted under 35 U.S.C. 154(b) by 255 days.

(21) Appl. No.: 17/475,821

(22) Filed: Sep. 15, 2021

(65) Prior Publication Data

US 2022/0088699 A1 Mar. 24, 2022

(30) Foreign Application Priority Data

Sep. 18, 2020 (JP) .................................. 2020-157895

(51) Int. Cl.
*B23K 11/11* (2006.01)
*B23K 11/00* (2006.01)
(Continued)

(52) U.S. Cl.
CPC ......... *B23K 11/115* (2013.01); *B23K 11/0026* (2013.01); *B23K 35/0261* (2013.01); *B23K 2101/18* (2018.08); *B23K 2103/04* (2018.08)

(58) Field of Classification Search
CPC .............. B23K 11/115; B23K 11/0033; B23K 11/0026
See application file for complete search history.

(56) References Cited

U.S. PATENT DOCUMENTS

| 5,047,608 A * | 9/1991 | Takahashi .......... B23K 11/3018 219/119 |
| 2007/0007253 A1* | 1/2007 | Wang .................... B23K 11/115 219/86.25 |

(Continued)

FOREIGN PATENT DOCUMENTS

| CN | 111590183 A * | 8/2020 | ........... B23K 11/115 |
| JP | 2006055898 A | 3/2006 | |

(Continued)

OTHER PUBLICATIONS

Machine translation WO-2018159764-A1, Jul. 2023. (Year: 2023).*
Machine translation CN111590183A, Jul. 2023 (Year: 2023).*

*Primary Examiner* — Geoffrey S Evans

(74) *Attorney, Agent, or Firm* — Withrow & Terranova, P.L.L.C; Vincent K. Gustafson

(57) ABSTRACT

A method of resistance spot welding that enables an improvement of a weld strength of steel plates having different plate thicknesses while inhibiting generation of spatters is provided. One aspect of the present disclosure is the method of resistance spot welding, the method including welding a workpiece made of layered steel plates with a resistance spot welding apparatus. The resistance spot welding apparatus includes a first electrode configured to contact a first steel plate among the steel plates, and a second electrode configured to contact, among the steel plates, a second steel plate that is thinner than the first steel plate, and the second electrode being arranged such that the workpiece is interposed between the first electrode and the second electrode. The welding includes welding while moving the second electrode relative to the first electrode in a direction parallel with a plate surface of the second steel plate.

3 Claims, 4 Drawing Sheets

(51) Int. Cl.
*B23K 35/02* (2006.01)
*B23K 103/04* (2006.01)
*B23K 101/18* (2006.01)

(56) References Cited

U.S. PATENT DOCUMENTS

2010/0024558 A1* 2/2010 Shibata .............. B23K 11/3063
  73/628
2016/0207138 A1* 7/2016 Ikeda ................. B23K 11/0033
2018/0079026 A1* 3/2018 Miyazaki ............... B23K 11/16

FOREIGN PATENT DOCUMENTS

| | | | |
|---|---|---|---|
| JP | 2012250247 A | 12/2012 | |
| JP | 2013173155 A | 9/2013 | |
| JP | 2013188752 A | 9/2013 | |
| JP | 2014083557 A | 5/2014 | |
| WO | WO-2018159764 A1 * | 9/2018 | ......... B23K 11/0026 |

* cited by examiner

METHOD OF RESISTANCE SPOT WELDING AND RESISTANCE SPOT WELDING APPARATUS

CROSS-REFERENCE TO RELATED APPLICATIONS

This application claims the benefit of Japanese Patent Application No. 2020-157895 filed on Sep. 18, 2020 with the Japan Patent Office, the entire disclosure of which is incorporated herein by reference.

BACKGROUND

The present disclosure relates to a method of resistance spot welding and a resistance spot welding apparatus.

When performing a resistance spot welding on a workpiece made of layered steel plates having different plate thicknesses, a nugget is formed in a center of thickness of the entire workpiece. This generates a possibility that the nugget does not sufficiently merge into some of the steel plates having small thicknesses.

An extent of merging of the nugget into the steel plates can be increased by increasing an electric current, which however facilitates generation of spatters. Thus, a method of increasing a joining strength has been suggested, in which two kinds of electrodes made of different materials are used to adjust a position of forming the nugget (see, Japanese Unexamined Patent Application Publication No. 2013-173155).

SUMMARY

The aforementioned method of resistance spot welding uses two kinds of electrodes for welding. Thus, if the electrodes are attached incorrectly, welding failures occur. In addition, the cost for the electrodes is high as one of the electrodes is required to be made of a material having high thermal conductivity.

Preferably, one aspect of the present disclosure is to provide a method of resistance spot welding that can improve weld strength of steel plates having different plate thicknesses while reducing generation of spatters.

One aspect of the present disclosure is a method of resistance spot welding, the method including welding a workpiece made of layered steel plates with a resistance spot welding apparatus. The resistance spot welding apparatus includes a first electrode configured to contact a first steel plate among the steel plates; and a second electrode configured to contact, among the steel plates, a second steel plate that is thinner than the first steel plate, and the second electrode being arranged such that the workpiece is interposed between the first electrode and the second electrode. The welding includes welding while moving the second electrode relative to the first electrode in a direction parallel with a plate surface of the second steel plate.

This configuration causes the second electrode to thrust into the second steel plate as the second electrode, which contacts the second steel plate that is thinner than the first steel plate, moves to deviate from the first electrode. A nugget formed before the deviation of the second electrode is pushed into the second steel plate to circumvent a dent portion of the second steel plate caused by the thrusting second electrode. The amount of the merged nugget in the second steel plate is therefore increased.

As a result, the weld strength of the steel plates having different plate thicknesses can be improved without limiting materials for the first electrode and the second electrode while inhibiting generation of the spatters caused by an increase of the electric current.

In one aspect of the present disclosure, the second electrode may be moveable relative to the first electrode in a direction the workpiece is interposed. In the welding, the workpiece may be retained such that a thickness direction of the workpiece intersects with the direction the workpiece is interposed. This configuration enables the second electrode to move relative to the first electrode during welding by using forces of the first electrode and the second electrode to interpose the workpiece.

In one aspect of the present disclosure, the direction the workpiece is interposed between the first electrode and the second electrode may be parallel with a vertical direction. In this configuration, a direction of gravity coincides with a direction of pressure on the workpiece, which enables a stable welding quality.

In one aspect of the present disclosure, the second electrode may be arranged on or above the workpiece. This configuration facilitates an arrangement of the workpiece on the resistance spot welding apparatus (that is, a preparation for the welding), resulting in an improvement of productivity.

Another aspect of the present disclosure is a resistance spot welding apparatus configured to weld a workpiece made of layered steel plates. The resistance spot welding apparatus includes a first electrode configured to contact a first steel plate among the steel plates; and a second electrode configured to contact, among the steel plates, a second steel plate that is thinner than the first steel plate, and the second electrode being arranged such that the workpiece is interposed between the first electrode and the second electrode. The resistance spot welding apparatus is configured such that, the welding includes welding while moving the second electrode relative to the first electrode in a direction parallel with a plate surface of the second steel plate.

This configuration increases the amount of the merged nugget in the second steel plate as mentioned above. As a result, the weld strength of the steel plates having different plate thicknesses can be improved without limiting materials for the first electrode and the second electrode while inhibiting generation of the spatters caused by an increase of the electric current.

In one aspect of the present disclosure, the second electrode may be moveable relative to the first electrode in a direction the workpiece is interposed. The resistance spot welding apparatus may further include a workpiece retainer for retaining the workpiece such that a thickness direction of the workpiece intersects with the direction the workpiece is interposed. This configuration enables the second electrode to move relative to the first electrode during the welding by using forces of the first electrode and the second electrode to interpose the workpiece.

In one aspect of the present disclosure, the direction the workpiece is interposed between the first electrode and the second electrode may be parallel with a vertical direction. In this configuration, the direction of gravity coincides with the direction of pressure on the workpiece, which enables a stable welding quality.

In one aspect of the present disclosure, the second electrode may be arranged on or above the workpiece. This configuration facilitates an arrangement of the workpiece on the resistance spot welding apparatus, resulting in an improvement of productivity.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. First Embodiment

[1-1. Configuration]

Figure 1:
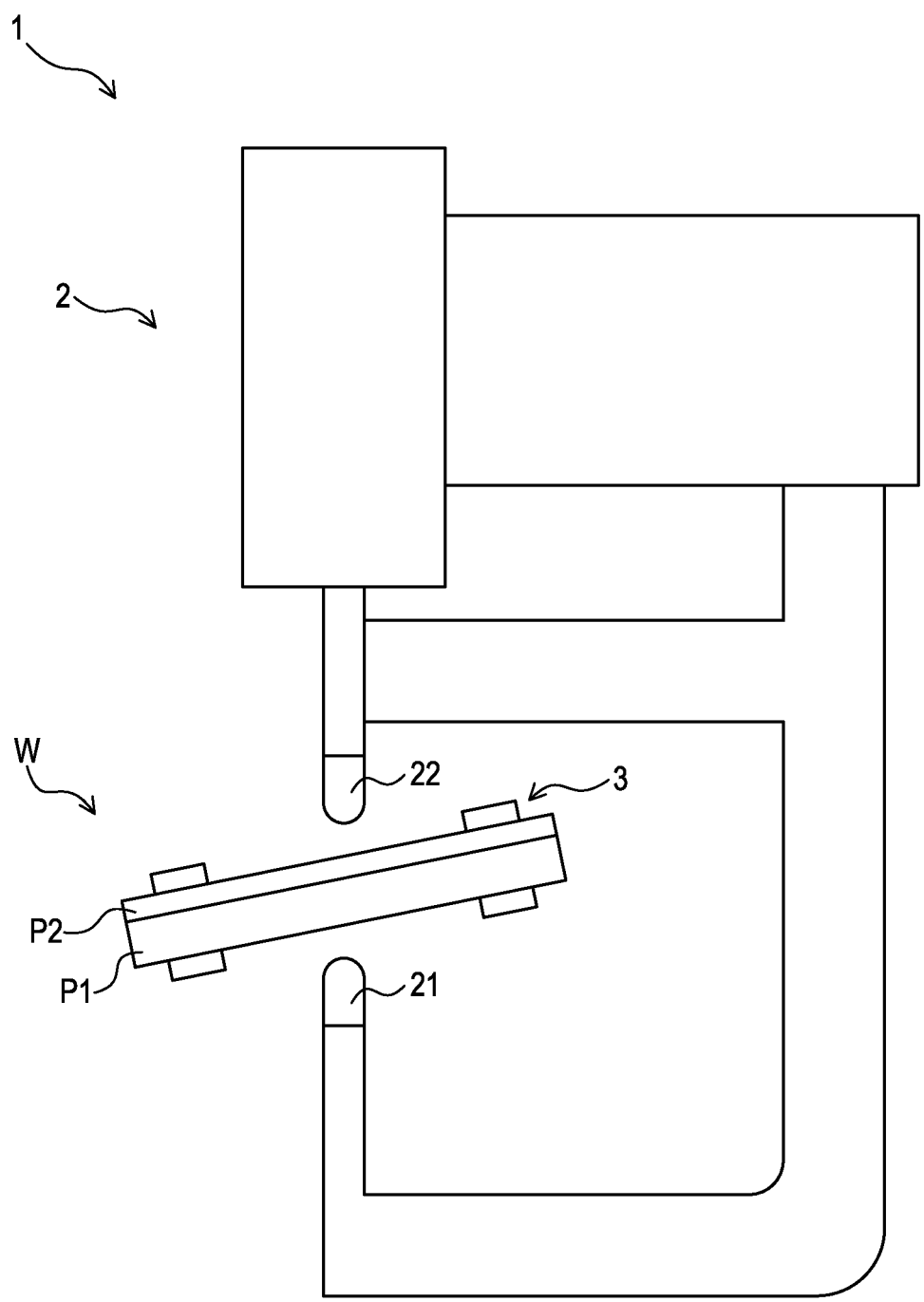
FIG. 1 is a schematic drawing of a resistance spot welding apparatus of an embodiment.

A resistance spot welding apparatus 1 shown in FIG. 1 is configured to weld a workpiece W made of layering a first steel plate P1 and a second steel plate P2. The resistance spot welding apparatus 1 includes a resistance welding device 2, and a workpiece retainer 3.

The first steel plate P1 has a thickness greater than a thickness of the second steel plate P2. In other words, the second steel plate P2 is thinner than the first steel plate P1. In the present embodiment, the second steel plate P2 is placed over the first steel plate P1. Materials for the first steel plate P1 and the second steel plate P2 are not limited to particular materials.

<Resistance Welding Device>

The resistance welding device 2 performs a resistance spot welding on the first steel plate P1 and the second steel plate P2 arranged as the workpiece W in a thickness direction.

The resistance welding device 2 includes a first electrode 21, and a second electrode 22. The first electrode 21 is arranged below the workpiece W. The second electrode 22 is arranged on or above the workpiece W such that the workpiece W is interposed between the first electrode 21 and the second electrode 22 and applied with a pressure.

The second electrode 22 is moveable relative to the first electrode 21 in a vertical direction. In the present embodiment, a direction the workpiece W is interposed between the first electrode 21 and the second electrode 22 (that is, a moving direction of the second electrode 22) is parallel with the vertical direction.

Each of the first electrode 21 and the second electrode 22 contacts the workpiece W during the welding. Specifically, the first electrode 21 is configured to contact the first steel plate P1; and the second electrode 22 is configured to contact the second steel plate P2. A welding electric current flows between the first electrode 21 and the second electrode 22 via the workpiece W.

<Workpiece Retainer>

The workpiece retainer 3 is configured to retain the workpiece W such that the thickness direction of the workpiece W (that is, a direction orthogonal to plate surfaces of the first steel plate P1 and the second steel plate P2) intersects with the direction the workpiece W is interposed (that is, the vertical direction).

The workpiece W is retained by the workpiece retainer 3 such that the plate surface of the first steel plate P1 and the plate surface of the second steel plate P2 tilt with respect to both the vertical direction and a horizontal direction. The workpiece retainer 3 includes, for example, a jig for holding the workpiece W.

The resistance spot welding apparatus 1 supplies an electric current between the first electrode 21 and the second electrode 22 while the workpiece W retained by the workpiece retainer 3 is interposed between the first electrode 21 and the second electrode 22, and welds the first steel plate P1 with the second steel plate P2.

Figure 2A:
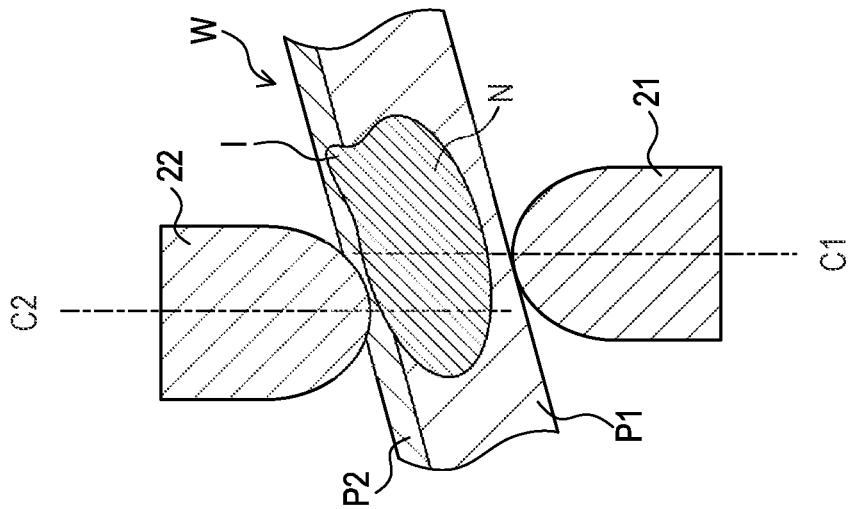
FIG. 2A is a schematic drawing showing a welding state of steel plates using the resistance spot welding apparatus.

In an initial stage of the welding, as shown in FIG. 2A, a central axis C1 of the first electrode 21 coincides with the central axis C2 of the second electrode 22. Note that the central axis C1 of the first electrode 21 and the central axis C2 of the second electrode 22 are straight lines each running through the center of the respective electrode in the horizontal direction, and are parallel with the vertical direction.

A nugget N in a molten state is formed between the first electrode 21 and the second electrode 22 by electric conduction. The central axis C1 of the first electrode 21 and the central axis C2 of the second electrode 22 pass through a center of gravity of the nugget N.

Figure 2B:
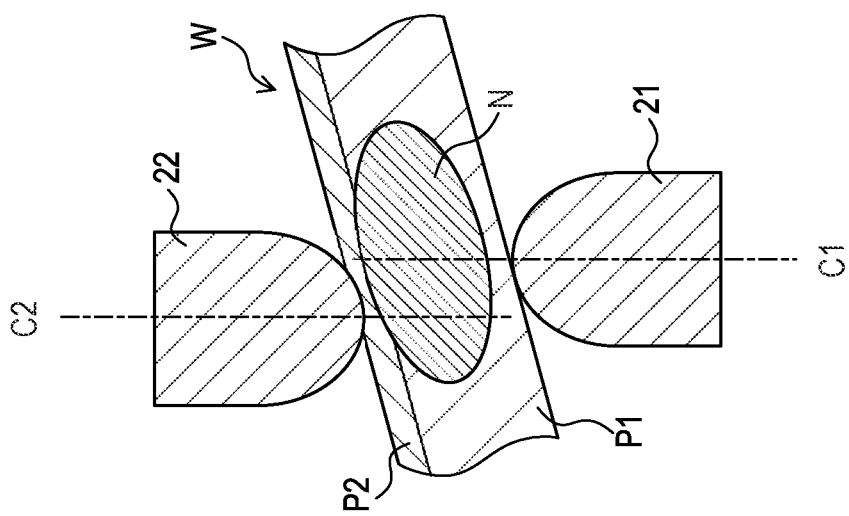
FIG. 2B is a schematic drawing showing a welding state subsequent to the welding state of FIG. 2A.

As the welding proceeds further, melting (that is, liquefaction) of the first steel plate P1 and the second steel plate P2 progresses. A repulsion force generated by an expansion of the second steel plate P2 lifts the second electrode 22 upward. As a result, as shown in FIG. 2B, the second electrode 22 slides downwardly along the plate surface of the second steel plate P2 away from a welding center (that is, the central axis C1 of the first electrode 21).

The slid second electrode 22 thrusts into the molten second steel plate P2 from above at a position deviated from the welding center. Note that, while the second electrode 22 is moving, the central axis C2 of the second electrode 22 stays parallel with the vertical direction. In other words, the second electrode 22 moves in the horizontal direction and in the vertical direction without changing its posture.

Figure 2C:
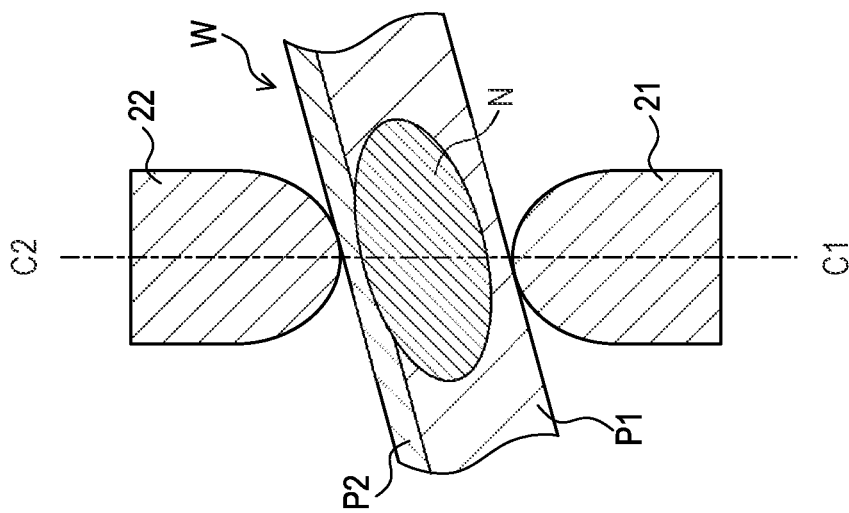
FIG. 2C is a schematic drawing showing a welding state subsequent to the welding state of FIG. 2B.

As shown in FIG. 2C, as the second electrode 22 thrusts into the second steel plate P2 while the central axis C2 of the second electrode 22 deviates from the central axis C1 of the first electrode 21, a portion of the nugget N (a squeezing portion I) is squeezed into the second steel plate P2 to circumvent the thrusting second electrode 22.

The squeezing portion I is formed in an upper part of one side of the nugget N opposite a side where the central axis C2 of the second electrode 22 runs with respect to the central axis C1 of the first electrode 21. The squeezing portion I is solidified as it is kept squeezed into the second steel plate P2.

In the present embodiment, the first electrode 21 is a fixed electrode fixed to the resistance welding device 2. Thus, the first electrode 21 does not move either in the horizontal direction or in the vertical direction during the welding. However, the first electrode 21 may be configured moveable in the horizontal direction or in the vertical direction.

As mentioned above, during the welding of the workpiece W, the resistance spot welding apparatus 1 is configured to move the second electrode 22 in a direction parallel with the plate surface of the second steel plate P2 (that is, a direction intersecting with both of the vertical direction and the horizontal direction) relative to the first electrode 21.

Note that the term "during welding" or "during the welding" means a process from a beginning of formation of a molten pool inside the steel plates by electric conduction until a completion of formation of the molten pool (that is, a stop of the electric conduction). Therefore, the resistance spot welding apparatus 1 moves the second electrode 22 after the formation of the molten pool is initiated.

[1-2. Method of Manufacturing]

Figure 3:
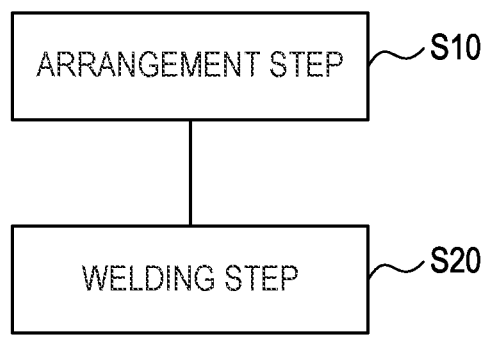
FIG. 3 is a flowchart of a method of resistance spot welding of an embodiment.

A method of resistance spot welding shown in FIG. 3 includes an arrangement step S10, and a welding step S20. The method of resistance spot welding of the present embodiment is performed by using the resistance spot welding apparatus 1 shown in FIG. 1 for example.

<Arrangement Step>

In this step, the workpiece W made of layering the first steel plate P1 and the second steel plate P2 in the thickness direction is arranged between the first electrode 21 and the second electrode 22 of the resistance welding device 2. The workpiece retainer 3 retains the workpiece W such that the thickness direction of the workpiece W intersects with the direction the workpiece W is interposed.

<Welding Step>

In this step, the first steel plate P1 and the second steel plate P2 layered on one another are welded by the resistance spot welding apparatus 1.

In this step, the second electrode 22 is moved in parallel with the plate surface of the second steel plate P2 relative to the first electrode 21 during the welding by using a pressure to the workpiece W between the first electrode 21 and the second electrode 22 (in other words, by pressing the second electrode 22 against the workpiece W).

[1-3. Effects]

The embodiment described above in detail renders the following effects.

(1a) By having the second electrode 22, which contacts the second steel plate P2 that is thinner than the first steel plate P1, move to deviate from the first electrode 21, the second electrode 22 thrusts into the second steel plate P2. This causes the nugget N, formed before the second electrode 22 is moved, to be squeezed into the second steel plate P2 to circumvent a concave portion of the second steel plate P2 formed by the thrusting second electrode 22.

This accordingly increases the amount of the merged nugget N in the second steel plate P2. As a result, the weld strength of the steel plates having different plate thicknesses can be improved without limiting materials for the first electrode 21 and the second electrode 22 while inhibiting generation of spatters caused by an increase of the electric current.

(1b) By having the workpiece W retained such that the thickness direction of the workpiece W intersects with the direction the workpiece W is interposed between the first electrode 21 and the second electrode 22, the second electrode 22 can be moved relative to the first electrode 21 during the welding by using forces of the first electrode 21 and the second electrode 22 to interpose the workpiece W.

(1c) By having the direction the workpiece W is interposed between the first electrode 21 and the second electrode 22 to be vertical, a direction of gravity coincides with a direction of pressure on the workpiece W, which enables a stable welding quality.

(1d) By having the second electrode 22 arranged on or above the workpiece W, arrangement of the workpiece W on the resistance spot welding apparatus 1 (that is, a preparation for welding) is facilitated, which results in an improvement of productivity.

2. Other Embodiments

An embodiment of the present disclosure has been explained above. Nevertheless, the present disclosure can be carried out in various modifications without being limited to the aforementioned embodiment.

(2a) In the resistance spot welding apparatus 1 and the method of resistance spot welding in the aforementioned embodiment, the workpiece W does not necessarily have to be retained such that the thickness direction of the workpiece W intersects with the direction the workpiece W is interposed between the first electrode 21 and the second electrode 22.

Figure 4C:
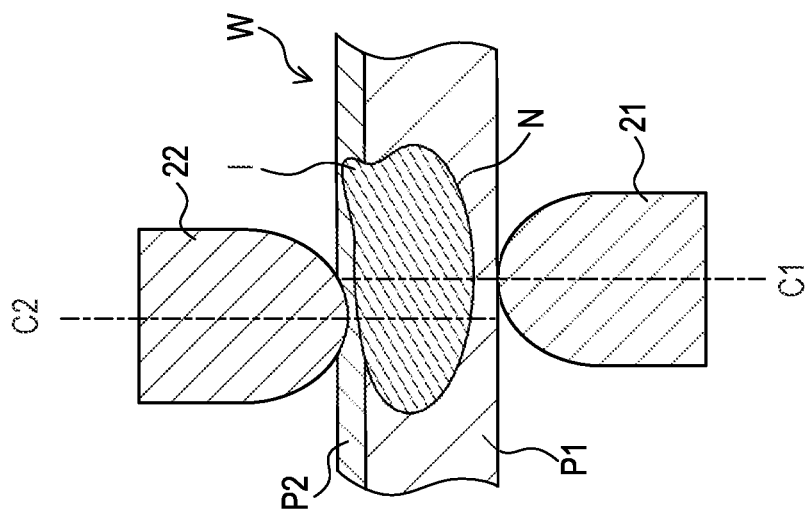
FIG. 4C is a schematic drawing showing a welding state subsequent to the welding state of FIG. 4B.
Figure 4B:
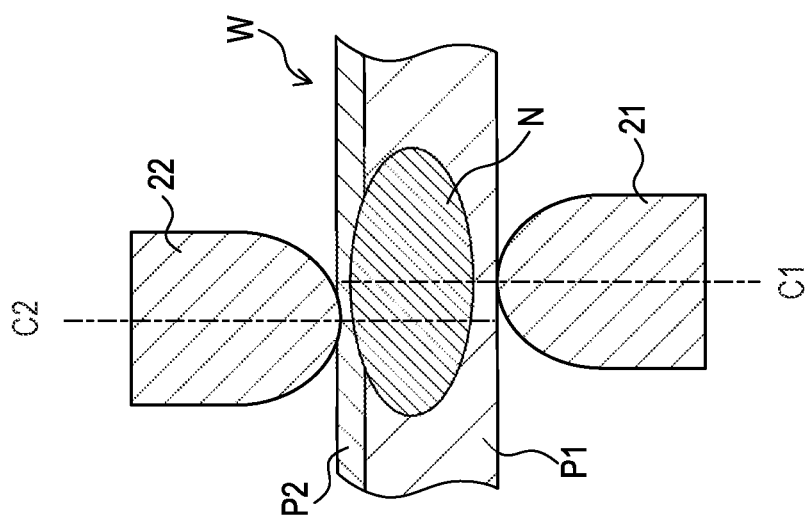
FIG. 4B is a schematic drawing showing a welding state subsequent to the welding state of FIG. 4A.
Figure 4A:
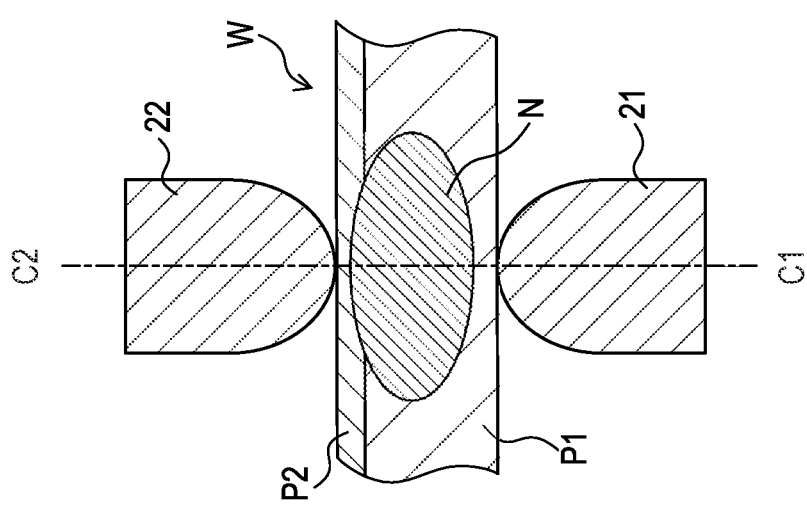
FIG. 4A is a schematic drawing showing a welding state of steel plates using a resistance spot welding apparatus in an embodiment different from FIG. 2A.

For example, if the second electrode 22 is mechanically moveable in a direction parallel with the plate surface of the second steel plate P2, then the workpiece W may be retained such that the thickness direction of the workpiece W is parallel with the direction the workpiece W is interposed between the electrodes as shown in FIG. 4A.

In the example shown in FIG. 4A, for example, a sliding mechanism, such as a cylinder, disposed in the resistance welding device 2 moves the second electrode 22 in a direction parallel with the plate surface of the second steel plate P2 during the welding as shown in FIG. 4B. As shown in FIG. 4C, as the second electrode 22 moves to deviate from the welding center, the second electrode 22 thrusts into the molten second steel plate P2 from above, causing the squeezing portion I of the nugget N to be squeezed into the second steel plate P2 to circumvent the thrusting second electrode 22.

(2b) In the resistance spot welding apparatus 1 and the method of resistance spot welding in the aforementioned embodiment, the workpiece W may include three or more steel plates. In other words, there may be one or more steel plates arranged between the first steel plate P1 and the second steel plate P2.

(2c) In the resistance spot welding apparatus 1 and the method of resistance spot welding in the aforementioned embodiment, the direction the workpiece W is interposed between the first electrode 21 and the second electrode 22 does not necessarily have to be vertical. The direction the workpiece W is interposed may be horizontal, or may intersect with both the vertical direction and the horizontal direction.

(2d) In the resistance spot welding apparatus 1 and the method of resistance spot welding in the aforementioned embodiment, the first electrode 21 may be moveable relative to the workpiece W. In other words, both the first electrode 21 and the second electrode 22 may move during the welding so that the second electrode 22 moves relative to the first electrode 21 in a direction parallel with the plate surface of the second steel plate P2.

(2e) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments. It should be noted that any and all modes included in the technical ideas that are identified by the languages recited in the claims are embodiments of the present disclosure.

What is claimed is:

1. A method of resistance spot welding, the method comprising welding a workpiece made of layered steel plates with a resistance spot welding apparatus, the resistance spot welding apparatus comprising:

a first electrode configured to contact a first steel plate among the steel plates; and a second electrode configured to contact, among the steel plates, a second steel plate that is thinner than the first steel plate, and the second electrode being arranged such that the workpiece is interposed between the first electrode and the second electrode, wherein the welding comprises welding while moving the second electrode relative to the first electrode in a direction parallel with a plate surface of the second steel plate.

2. The method of resistance spot welding according to claim 1, wherein the second electrode is moveable relative to the first electrode in a direction the workpiece is interposed, and wherein, in the welding, the workpiece is retained such that a thickness direction of the workpiece intersects with the direction the workpiece is interposed.

3. The method of resistance spot welding according to claim 1, wherein the direction the workpiece is interposed between the first electrode and the second electrode is a vertical direction.

* * * * *